(12) United States Patent
Ohkawa (10) Patent No.: US 12,531,278 B2
(45) Date of Patent: Jan. 20, 2026

(54) SODIUM-ION-PERMEABLE PLATE-LIKE PARTITIONING WALL AND METHOD FOR MANUFACTURING SAME

(71) Applicant: KABUSHIKI KAISHA JINKOSHIGEN KENKYUSHO, Nagoya (JP)

(72) Inventor: Hiroshi Ohkawa, Nisshin (JP)

(73) Assignee: KABUSHIKI KAISHA JINKOSHIGEN KENKYUSHO, Nagoya (JP)

(*) Notice: Subject to any disclaimer, the term of this patent is extended or adjusted under 35 U.S.C. 154(b) by 156 days.

(21) Appl. No.: 18/548,384

(22) PCT Filed: Feb. 28, 2022

(86) PCT No.: PCT/JP2022/008298
§ 371 (c)(1),
(2) Date: Aug. 30, 2023

(87) PCT Pub. No.: WO2022/186139
PCT Pub. Date: Sep. 9, 2022

(65) Prior Publication Data
US 2024/0145788 A1    May 2, 2024

(30) Foreign Application Priority Data
Mar. 2, 2021  (JP) ................. 2021-032980

(51) Int. Cl.
*H01M 10/39*  (2006.01)
*H01M 10/38*  (2006.01)

(52) U.S. Cl.
CPC ....... *H01M 10/3918* (2013.01); *H01M 10/38* (2013.01); *H01M 10/3945* (2013.01); *H01M 2300/0068* (2013.01)

(58) Field of Classification Search
CPC ............. H01M 10/3918; H01M 10/38; H01M 10/3945; H01M 2300/0068;
(Continued)

(56) References Cited

U.S. PATENT DOCUMENTS

| | | | |
|---|---|---|---|
| 3,915,741 A | 10/1975 | Kogiso et al. | |
| 5,385,700 A | 1/1995 | Denton | |

(Continued)

FOREIGN PATENT DOCUMENTS

| | | |
|---|---|---|
| CA | 2030461 A1 | 6/1991 |
| CN | 1053325 A | 7/1991 |

(Continued)

OTHER PUBLICATIONS

Decision to Grant mailed on Sep. 3, 2024, in corresponding Japanese Patent Application No. 2023-503826 (with English machine translation).

(Continued)

*Primary Examiner* — Lisa S Park
(74) *Attorney, Agent, or Firm* — Oblon, McClelland, Maier & Neustadt, L.L.P.

(57) ABSTRACT

An object is to provide a plate-like partitioning wall allowing permeation of sodium ions therethrough and having high safety and durability.
A plate-like partitioning wall 2 of the present invention is formed from a solid electrolyte allowing permeation of sodium ions therethrough. The plate-like partitioning wall 2 has a plate-like shape having, in a center part in the thickness direction thereof, a negative electrode chamber 20 to which molten sodium is supplied. This negative electrode chamber 20 is formed as a foil-like space extending in two-dimensional directions or as a pore-like space extending in two-dimensional directions in a net-like shape.
The negative electrode chamber 20 of this plate-like partitioning wall 2 is formed as a thin foil-like space or as a fine (Continued)

pore-like space, and thus, the amount of molten sodium stored therein is very small. Therefore, even when this plate-like partitioning wall 2 is broken and reaction with molten sulfur occurs, the amount of heat generation is small, ignition is not caused, and thus, safety is high.

The burn-out pattern and the organic matter powder forming the negative electrode chamber may also be those that are thin or fine. Thus, a small crack or the like is less likely to occur in the compacted body, and durability of the plate-like partitioning wall is high and manufacture thereof is facilitated.

6 Claims, 3 Drawing Sheets (58) Field of Classification Search
CPC ....... H01M 2300/0048; H01M 10/399; H01M 50/406; H01M 50/437; H01M 50/463; H01M 10/3909; H01M 10/3936; C04B 2235/604; C04B 35/111; C04B 35/62695; C04B 2111/00853; C04B 38/062; C04B 35/113; Y02E 60/10
See application file for complete search history.

(56) References Cited

U.S. PATENT DOCUMENTS

| | | | |
|---|---|---|---|
| 10,637,103 B2 | 4/2020 | Ohkawa | |
| 2018/0287216 A1* | 10/2018 | Ohkawa | ............ H01M 10/3945 |
| 2018/0375163 A1 | 12/2018 | Ohkawa | |
| 2021/0351442 A1 | 11/2021 | Ohkawa | |

FOREIGN PATENT DOCUMENTS

| | | | |
|---|---|---|---|
| CN | 104556980 A | | 4/2015 |
| CN | 106711465 | * | 5/2017 |
| CN | 206727163 | * | 12/2017 |
| CN | 108140905 A | | 6/2018 |
| CN | 108292784 A | | 7/2018 |
| CN | 108140905 B | | 12/2020 |
| EP | 3 361 549 A1 | | 8/2018 |
| FR | 2 676 050 A1 | | 11/1992 |
| GB | 2 255 309 A | | 11/1992 |
| JP | 50-38030 A | | 4/1975 |
| JP | 5-177619 A | | 7/1993 |
| JP | 2664161 B2 | | 10/1997 |
| JP | 2017-103197 A | | 6/2017 |
| JP | 6732218 B2 | | 7/2020 |
| KR | 10-2018-0048999 A | | 5/2018 |
| KR | 10-2018-0063276 A | | 6/2018 |
| RU | 2 522 173 C1 | | 7/2014 |
| TW | 201726942 | | 8/2017 |
| WO | WO 2017/090636 A1 | | 6/2017 |
| WO | WO 2020/153125 A1 | | 7/2020 |
| WO | WO 2021/260962 A1 | | 12/2021 |

OTHER PUBLICATIONS

Extended European Search Report issued Feb. 19, 2025, in corresponding European Patent Application No. 22763195.9, 8 pages.
International Search & Written Opinion Report mailed on May 10, 2022 in PCT/JP2022/008298 filed on Feb. 28, 2022 (20 pages).
Korean Office Action issued Mar. 14, 2025, in corresponding Korean Patent Application No. 10-2023-7029342 (with English Translation), 9 pages.
Brazilian Office Action issued May 6, 2025 in Brazilian Patent Application No. BR112023017581-0 (with unedited computer-generated English translation), 12 pages.
Combined Taiwanese Office Action and Search Report issued May 28, 2015, in corresponding Taiwanese Patent Application No. 111107540 (with English Translation), 8 pages.
Russian Decision to Grant and Search Report issued Jun. 5, 2025, in corresponding Russian Patent Application No. 2023125061 (with English Translation), 15 pages.
Combined Chinese Office Action and Search Report issued Apr. 26, 2025, in corresponding Chinese Patent Application No. 202280017994.0 (with English Translation and English Translation of Category of Cited Documents), 18 pages.

* cited by examiner

SODIUM-ION-PERMEABLE PLATE-LIKE PARTITIONING WALL AND METHOD FOR MANUFACTURING SAME

TECHNICAL FIELD

The present invention relates to a plate-like partitioning wall allowing permeation of sodium ions therethrough and to be used in a sodium-sulfur battery, a sodium molten salt battery, or the like.

BACKGROUND ART

As a large-capacity secondary battery, a sodium-sulfur battery is known. In the sodium-sulfur battery, molten sulfur is used as a positive electrode active material, molten sodium is used as a negative electrode active material, and a solid electrolyte such as β-alumina allowing permeation of sodium ions $Na^+$ therethrough forms a partitioning wall for separating the molten sulfur and the molten sodium from each other. The molten sulfur is stored in a positive electrode chamber, and the molten sodium is stored in a negative electrode chamber. The positive electrode chamber and the negative electrode chamber are respectively conductive with a positive electrode terminal and a negative electrode terminal of the sodium-sulfur battery.

During discharging of the battery, sodium in the negative electrode chamber is separated into electrons and sodium ions, and the electrons flow from the negative electrode terminal to the outside to be sent to the positive electrode terminal via an external circuit, and the sodium ions $Na^+$ permeate the partitioning wall to move to the positive electrode chamber. In the positive electrode chamber, electrons are provided from the positive electrode terminal, and the provided electrons, the sodium ions $Na^+$, and molten sulfur S undergo chemical reaction, whereby sodium polysulfide $Na_2S_x$ is generated. During charging, reactions reverse to these reactions during discharging occur.

During charging, sodium ions $Na^+$, electrons, and sulfur S are generated from sodium polysulfide $Na_2S_x$, and the sodium ions $Na^+$ permeate the partitioning wall to move from the positive electrode chamber to the negative electrode chamber. That is, the sodium ions $Na^+$, during discharging, permeate the partitioning wall to move from the negative electrode chamber to the positive electrode chamber, and during charging, permeate the partitioning wall to move from the positive electrode chamber to the negative electrode chamber.

The molten sulfur and the molten sodium as the active materials of the sodium-sulfur battery each need to be in a molten state, i.e., liquid. The sodium-sulfur battery operates at a high temperature of 290 to 350 degrees.

Regarding the partitioning wall, as partitioning walls for sodium-sulfur batteries and sodium molten salt batteries, only those having a tubular shape whose upper end is open and whose lower end is closed have been put into practical use. International Application publication specification WO 2017/090636 A1 proposes a plate-like partitioning wall having, in a center part in the thickness direction thereof, a negative electrode chamber space. However, the plate-like partitioning wall has low durability as a partitioning wall, and has not been put into practical use.

Conventionally, in order to form a negative electrode chamber space having a predetermined size in a center part in the thickness direction, when a burn-out pattern is embedded in a center part of a granulated powder such as β-alumina and the resultant matter is subjected to pressure forming and further subjected to CIP forming, a crack is caused in the obtained compacted body due to action considered to be spring back of the burn-out pattern. Therefore, producing a negative electrode chamber by using a burn-out pattern has not been possible.

As a method not using a burn-out pattern, a method in which a plate-like partitioning wall having a negative electrode chamber in a center part thereof is manufactured by attaching thin plates of β-alumina or the like to each other has been known. In this method, using a granulated powder of β-alumina, a front plate, a back plate, and a frame plate each having a thin plate-like shape, the frame plate having a center portion thereof removed so as to create a negative electrode chamber, are produced, thereby preparing three β-alumina parts. Then, the front plate and the back plate are joined to this frame plate on the upper side and the lower side thereof with a glass joining agent, whereby a plate-like partitioning wall having a negative electrode chamber therein is manufactured. Using this method, plate-like partitioning walls were produced with the glass joining agent changed or the β-alumina thin plates changed, single cells of sodium-sulfur batteries were produced using these plate-like partitioning walls, and charging/discharging tests were performed. However, no single cell having a durability performance exceeding one month was obtained.

The inventor completed an invention of a sodium-sulfur battery that is safe and that has a partitioning wall having a tubular shape, and filed a patent application as WO 2021/260962 A1. In this invention, the inventor came to know that, as a negative electrode chamber of a partitioning wall, narrow gaps that are not visually observed such as voids or gaps between sintered particles function as a negative electrode chamber. Then, the inventor arrived at an idea that the negative electrode chamber need not be a conventional large space recognizable as a chamber. That is, the inventor arrived at an idea that, when narrow gaps that are not visually observed such as voids occurring in gaps between sintered particles are connected, a space functioning as a negative electrode chamber is obtained, and completed the present invention.

CITATION LIST

Patent Literature

Patent Literature 1: WO 2017/090636 (A1)
Patent Literature 2: WO 2021/260962 (A1)

SUMMARY OF INVENTION

Technical Problem

An object of the present invention is to provide a plate-like partitioning wall allowing permeation of sodium ions therethrough and having high safety and durability.

Solution to Problem

A plate-like partitioning wall of the present invention is a plate-like partitioning wall formed from a solid electrolyte allowing permeation of sodium ions therethrough, the plate-like partitioning wall having a plate-like shape and having, in a center part in a thickness direction thereof, a negative electrode chamber to which molten sodium is supplied, the negative electrode chamber being formed as a foil-like space extending in two-dimensional directions or as a pore-like space extending in two-dimensional directions in a net-like shape.

The negative electrode chamber of the plate-like partitioning wall of the present invention is formed as a thin foil-like space or as a fine pore-like space. Therefore, the space forming the negative electrode chamber is very narrow and has a very small volume, and the amount of molten sodium stored in the negative electrode chamber is also very small. Therefore, even when the plate-like partitioning wall is broken due to damage, and reaction with molten sulfur around the plate-like partitioning wall occurs, the amount of generated heat is small since the amount of molten sodium is small. Thus, the temperature of molten sulfur around the plate-like partitioning wall, including the plate-like partitioning wall, is merely increased to a slight extent, and thus, safety is high.

Since the negative electrode chamber is formed as a thin foil-like space or as a fine pore-like space, the burn-out pattern and the organic matter for forming these spaces may also be those that are thin or fine. That is, instead of a conventional burn-out pattern having a large volume, a burn-out pattern and an organic matter powder having a small volume are used. Thus, a small crack or the like is less likely to occur in the compacted body that is obtained, and manufacture of the plate-like partitioning wall is facilitated.

Further, in the case of the plate-like partitioning wall, a front-side wall part and a back-side wall part positioned on both sides of the negative electrode chamber both function as a partitioning wall. Therefore, the front face and the back face of the plate-like partitioning wall both function as the partitioning wall surface and contribute to increase in the partitioning wall surface.

The plate-like partitioning wall of the present invention has, in a center part in the thickness direction thereof, the negative electrode chamber, and this negative electrode chamber is formed as a foil-like space extending in two-dimensional directions or as a pore-like space extending in two-dimensional directions in a net-like shape.

Preferably, the foil-like space forming the negative electrode chamber has a thickness of not greater than 0.5 mm. Further, preferably, this foil-like space has a thickness of not greater than 0.1 mm. Preferably, the foil-like space is thinner in a range where the function of allowing the molten sodium to flow therein is ensured. The foil-like space may have a support part penetrating the foil-like space in the thickness direction of the space, and connecting the front-side part and the back-side part of the plate-like partitioning wall. The support part may have a columnar shape or a wall shape.

Preferably, the pore-like space forming the negative electrode chamber has a pore diameter of not greater than 0.5 mm. Further, preferably, this pore-like space has a pore diameter of not greater than 0.1 mm. Preferably, the pore-like space is finer in a range where the function of allowing the molten sodium to flow therein is ensured.

This pore-like space may have a net-like shape extending in two-dimensional directions. The porous part having this pore-like space may have a large thickness. When this porous part is thick, the plate-like partitioning wall naturally becomes thick, thereby becoming a plate-like partitioning wall having a large thickness. When the plate-like partitioning wall is thick, mechanical strength is increased, and thus, a large plate-like partitioning wall is realized.

A method for manufacturing the plate-like partitioning wall of the present invention will be described. One manufacturing method is a method in which a foil-like negative electrode chamber extending in two-dimensional directions is formed by using a burn-out pattern.

This burn-out pattern is formed from a foil-like organic matter having a small thickness. This foil-like organic matter may be a fiber formed article. This burn-out pattern may have a communication hole such as a penetration hole or a penetration wall penetrating the front face and the back face of the burn-out pattern. The granulated powder enters this communication hole and is degreased and sintered, to serve as a support part that connects the front-side part and the back-side part divided in the thickness direction by the negative electrode chamber of the manufactured plate-like partitioning wall. With this support part, integrity between the front-side part and the back-side part of the plate-like partitioning wall is increased, and a negative electrode chamber wide in two-dimensional directions is realized.

As the organic matter forming this foil-like burn-out pattern, polyvinyl alcohol for which degreasing is easy or a carbohydrate compound such as cellulose for which thermal decomposition is easy are considered to be preferable, but the organic matter is not limited thereto. In limited test results, a plurality of ordinary hygiene gauzes superposed on each other were good as the burn-out pattern. A cotton cloth, a nonwoven fabric, and paper were also usable as the burn-out pattern but were not as good as or better than gauze.

A property required for the burn-out pattern is having a property in which the shape of a formed object press-formed in the granulated powder is not restored to a shape before being formed. A gauze is obtained by loosely weaving less twisted cotton yarns, and individual fibers forming the gauze are considered to move while shifting with each other, thereby relaxing repulsive force. Therefore, repulsive force of the gauze due to compression, i.e., force causing the shape of the gauze to be restored to the shape before the compression, is considered to be weak. Thus, the gauze is suitable for a burn-out pattern material for the plate-like partitioning wall having durability.

Ice is considered as a material that provides the burn-out pattern with the property of not being restored to the shape before forming. A gauze is impregnated with water and then is cooled, to change the water into ice, and the resultant matter is subjected to press-forming under the freezing point, and then is heated to change the ice to water. The change to water unbinds individual fibers forming the gauze, whereby the fibers become relatively easy to slide. Further, the volume of the ice decreases, the burn-out pattern being compressed becomes slightly small, and repulsive force due to the burn-out pattern becomes small. Accordingly, occurrence of a microcrack that may be caused at the negative electrode chamber surface is suppressed, and a plate-like partitioning wall having more durability is obtained.

The compacted body according to the present invention is obtained by covering the outer periphery of the foil-like burn-out pattern with a granulated powder of a solid electrolyte such as β-alumina and pressing the sheet-like granulated powder having the foil-like burn-out pattern in a center part in the thickness direction. In order to obtain a homogenous compacted body, CIP forming capable of pressurizing with the same force from the outer peripheral face, is preferably adopted.

Another manufacturing method is a method in which a negative electrode chamber in which the pore extends in two-dimensional directions to form a net-like shape is formed. In this manufacturing method, a continuous pore formation member having a sheet-like shape and composed of a mixed powder of a ceramic powder and an organic matter powder is used instead of the burn-out pattern. In this manufacturing method, only the use of the continuous pore formation member instead of the burn-out pattern is different, and the other is the same as that in the manufacture of the plate-like partitioning wall using the burn-out pattern.

This continuous pore formation member is pressed to be compacted, and then is heated and sintered. During the heating and sintering, the organic matter powder of the continuous pore formation member is burnt out to be removed, and the portion where the organic matter powder has been present becomes a cavity. The ceramic powder as the other component of the continuous pore formation member is sintered, and the continuous pore formation member becomes a porous ceramic in which the pore is continuous. The continuous pore of this porous ceramic serves as the negative electrode chamber.

As the organic matter powder for forming the pore, a particulate organic matter, or a powder composed of an organic binder that is used for the granulated powder may be adopted. As the ceramic powder, a β-alumina powder is preferable, but a ceramic powder such as an alumina powder may also be used.

In a still another manufacturing method, a front-side wall part and a back-side wall part positioned on both sides of the negative electrode chamber of the plate-like partitioning wall are individually sintered as separate bodies, to be sintered bodies each composed of a solid electrolyte. The front-side wall part and the back-side wall part are superposed on each other, a glass joining material is applied to the side faces around the superposed two sintered bodies, or surface portions of peripheral edge portions of the superposed faces, and the resultant matter is heated, to be integrally joined with the glass joining material. The negative electrode chamber is formed as a void-like space formed between the superposed opposing faces. The applied joining material serves as the frame member precursor of the present invention, and by being joined, becomes the frame member of the present invention.

The frame member precursor has a loop shape whose both ends are opposed to each other at a predetermined interval. The space between both ends of this loop shape serves as the entrance/exit with respect to the negative electrode chamber to be formed. Together with the frame member precursor having this loop shape, a support part precursor positioned in this loop and joining the front-side member and the back-side member to each other may be formed. Due to the support body obtained by heating and melting the support part precursor, the integrity between the front-side member and the back-side member is increased, and mechanical strength of the plate-like partitioning wall that is obtained is also increased.

In this plate-like partitioning wall, the void-like space which is defined by the opposing faces of the front-side member and the back-side member, and in which the frame member, or the frame member and the support body, for the front-side wall part and the back-side wall part are not present, serves as the negative electrode chamber.

In this manufacturing method, the plate-like partitioning wall is obtained by three parts, i.e., the front-side member and the back-side member each being the solid electrolyte, and the glass joining material to serve as the frame member. That is, the frame member as a sintered body conventionally required is not required. Therefore, manufacture is facilitated, and damage due to the frame member composed of a sintered body is avoided. The negative electrode chamber formed by this method is composed of: the planes opposing each other of the front-side member and the back-side member; and a glass joining layer to be a frame member defining the loop-shaped outer peripheral end face of the negative electrode chamber. The thickness of the negative electrode chamber is mainly the thickness of the glass joining layer. The thinner the thickness of the glass joining layer is, the better. Thus, the negative electrode chamber composed of a thin foil-like space is formed.

In the invention of the method for manufacturing the plate-like partitioning wall of the present invention using the burn-out pattern, the shape of the burn-out pattern is a thin foil-like shape. That is, the burn-out pattern is very small in amount, and in addition, expands two-dimensionally. Therefore, a negative electrode chamber in which repulsive force due to the burn-out pattern is small and a microcrack is less likely to occur, is realized. In the manufacturing method in which the negative electrode chamber is realized by a porous matter in which the pore is continuous, a particulate organic matter is used as the pore formation component. Therefore, a porous body that has a continuous pore and in which the number of microcracks is small is easy to be obtained. Therefore, a plate-like partitioning wall having high durability is easy to be obtained.

In the method for manufacturing the plate-like partitioning wall using the glass joining material, the conventional frame-like ceramic part is not required. Therefore, not only is manufacture facilitated, a plate-like partitioning wall having higher durability is obtained as well.

Advantageous Effects

The plate-like partitioning wall of the present invention is formed from a solid electrolyte allowing permeation of sodium ions therethrough, the plate-like partitioning wall having a plate-like shape and having, in a center part in a thickness direction thereof, a negative electrode chamber to which molten sodium is supplied. This negative electrode chamber is formed as a foil-like space extending in two-dimensional directions or as a pore-like space extending in two-dimensional directions in a net-like shape. This plate-like partitioning wall is used as a partitioning wall for a sodium-sulfur battery. During discharging, sodium in the negative electrode chamber is separated into sodium ions and electrons, and the sodium ions pass through the solid electrolyte forming the plate-like partitioning wall, to be released from the outer peripheral face of the solid electrolyte into the positive electrode chamber. Due to the sodium ions, electrons transferred via an external circuit, and sulfur in the positive electrode chamber, sodium sulfide is generated in the positive electrode chamber, and discharge of about 2.1 V occurs. When charging voltage is applied to the external circuit, sodium sulfide in the positive electrode chamber is separated into sodium ions, electrons, and sulfur, and the sodium ions return to the negative electrode chamber and become sodium with electrons sent via the external circuit, to be generated in the negative electrode chamber.

In the plate-like partitioning wall of the present invention, the negative electrode chamber thereof is formed as a foil-like space extending in two-dimensional directions or as a pore-like space extending in two-dimensional directions in a net-like shape. Therefore, the volume of the space of the negative electrode chamber is very small, and the amount of sodium stored therein is also very small. Therefore, even when this plate-like partitioning wall is damaged and broken, and the sodium in the negative electrode chamber reacts with the sulfur in the positive electrode chamber, the amount of generated heat is small since the amount of sodium is very small. Thus, the temperature of the broken portion of the plate-like partitioning wall and of molten sulfur around the portion is merely increased to a slight extent, and thus, ignition is not caused. Therefore, safety of the sodium-sulfur battery using this plate-like partitioning wall is high.

In a sodium-sulfur battery, ordinarily, the pressure in the negative electrode chamber is lower than the pressure in the positive electrode chamber. Therefore, when the partitioning wall is broken, molten sulfur in the positive electrode chamber flows into the negative electrode chamber, and flows from the broken places in the sodium tank direction in the negative electrode chamber. At the broken portion, molten sodium and molten sulfur react with each other, and change into sodium sulfide while releasing heat of reaction. The generated sodium sulfide flows to the sodium tank side in the negative electrode chamber according to the pressure difference between the negative electrode chamber and the positive electrode chamber. On the sodium tank side in the negative electrode chamber, unreacted molten sodium is always present. Thus, the generated sodium sulfide and the unreacted molten sodium react with each other to change into sodium sulfide that has a large content of the sodium component relative to the sulfur component. The sodium sulfide having a large content of the sodium component has a high melting point, and thus, eventually becomes solid sodium sulfide, that is, solidifies in the negative electrode chamber to close the negative electrode chamber. Since the negative electrode chamber is closed by the solid sodium sulfide, further reaction between sodium and sulfur is inhibited. Thus, in the plate-like partitioning wall of the present invention, even when breakage has occurred, solid sodium sulfide is generated at the broken places and closes the broken places. Therefore, a big disaster such as ignition is not caused. Thus, the plate-like partitioning wall of the present invention provides a sodium-sulfur battery having high safety.

Since the negative electrode chamber is formed as a thin foil-like space or as a fine pore-like space, the burn-out pattern and the organic matter powder forming these spaces may also be those that are thin or fine. That is, instead of a conventional burn-out pattern having a large volume, a burn-out pattern and an organic matter powder having a small volume are used. Thus, a small crack or the like is less likely to occur in the compacted body that is obtained, and manufacture of the plate-like partitioning wall is facilitated.

Further, in the case of the plate-like partitioning wall, the front-side wall part and the back-side wall part positioned on both sides of the negative electrode chamber both function as a partitioning wall. Therefore, the front face and the back face of the plate-like partitioning wall both function as the partitioning wall surface and contribute to increase in the partitioning wall surface.

DESCRIPTION OF EMBODIMENTS (1) β-Alumina Plate-Like Partitioning Wall of Embodiment 1

Figure 1:
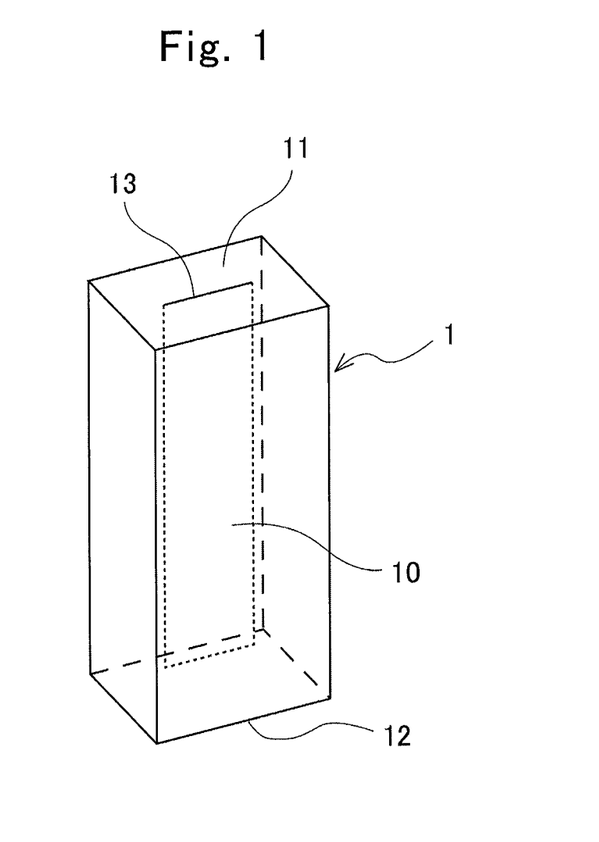
FIG. 1 is a perspective view of the entirety of a β-alumina plate-like partitioning wall according to Embodiment 1.

FIG. 1 shows a perspective view of the entirety of a β-alumina plate-like partitioning wall 1 of Embodiment 1.

This plate-like partitioning wall 1 has a plate-like shape having a lateral width of about 20 mm, a height of about 63 mm, and a thickness of about 10 mm, and the entirety of the plate-like partitioning wall 1 is formed from β-alumina. This plate-like partitioning wall 1 has, in a center part in the thickness direction thereof, a negative electrode chamber 10.

This negative electrode chamber 10 is exposed in the form of an opening 13 in an upper face 11 of the plate-like partitioning wall 1. The negative electrode chamber 10 is, with the shape thereof indicated by a dotted line in FIG. 1, formed as a space having a rectangular shape: extending from the upper face 11 to about 5 mm above a lower face 12 of the plate-like partitioning wall 1; and extending by about 9 mm in the lateral width direction, at the center in the lateral width direction. A cross section in the lateral direction of the negative electrode chamber 10 is considered to be similar to that of the opening 13. This opening 13 has a void-like shape extending in a zigzag manner in the width direction.

In the void-like space forming the negative electrode chamber 10, innumerable fine columnar connection parts integrally coupling both sides of this void-like space are considered to be present. The front-face-side portion and the back-face-side portion of the plate-like partitioning wall 1 on both sides of this void-like space are considered to be integrally connected by these innumerable columnar connection parts, to serve as an integrated object and contribute to improvement of mechanical strength.

Next, a method for manufacturing this plate-like partitioning wall 1 will be described. As the mold, a female mold having a cylindrical shape having a cylinder-like mold space whose cross-sectional space has a rectangular shape measuring, in a cross section, about 25 mm vertically and about 80 mm laterally; and two piston-like male molds each having a rectangular cross section and configured to enter the cylinder-like space of this female mold, were prepared.

A male mold was inserted a little into the female mold from below, and a shallow rectangular recess space defined by an upper portion of the inner peripheral face of the female mold and the upper face of the inserted male mold was formed. About 25 g of a β-alumina granulated powder was put into this recess space, and the thickness of the granulated powder was uniformly smoothed. On this granulated powder, a band-like to-be-lost pattern composed of four medical gauzes superposed on each other and measuring about 74 mm vertically, about 12 mm laterally, and about 0.4 mm in thickness was disposed so as to be positioned at the center in the recess space and in a state where one end of the band-like to-be-lost pattern is in contact with a mold face of the female mold and the other end thereof is separated from the opposing mold face of the female mold.

Then, over this to-be-lost pattern, about 25 g of the β-alumina granulated powder was placed and the thickness was uniformly smoothed. Then, the other male mold was pressed into the female mold from above, and the β-alumina granulated powder having the to-be-lost pattern at the center was compacted between both male molds. The obtained compacted body was further subjected to CIP forming, to produce a denser compacted body. This compacted body was heated and fired up to 1600° C., to manufacture the plate-like partitioning wall 1 of the present embodiment.

A trial to confirm whether or not molten sodium entered a negative electrode chamber 2 of the obtained plate-like partitioning wall 1 was performed. In this trial, one end opening of a glass tube was pressed against the opening 13 of this plate-like partitioning wall 1, this state was fixed by a heat-resistant epoxy resin adhesive, whereby the glass tube and the plate-like partitioning wall were integrally coupled to each other, and the negative electrode chamber 2 of the plate-like partitioning wall 1 and the glass tube were joined to each other in an airtight manner. The other end of this glass tube was immersed in molten sodium heated to 130° C., the surface of the molten sodium was subjected to pressure reduction and pressure increase with argon gas, and this was repeated several times, whereby a trial of causing the molten sodium to enter the negative electrode chamber 10 was performed.

In this state, cooling to room temperature was performed, an electric lamp was lit against the back-side surface of the plate-like partitioning wall 1, and light transmitted to the front-side surface of the plate-like partitioning wall 1 was observed. The front-side surface of the plate-like partitioning wall 1 glowed white in a rectangular shape due to the transmitted light of the electric lamp, and in a portion, in a center portion of the rectangular shape, that corresponds to the negative electrode chamber 10, a dim shadow in which light was blocked by sodium held in the negative electrode chamber 10, was observed. Accordingly, a fact that molten sodium enters the negative electrode chamber 10 of the plate-like partitioning wall 1 was confirmed.

That is, a fact that this negative electrode chamber 10 is connected to the outside through the opening 13 and is held inside the plate-like partitioning wall 1 was confirmed. No defect such as a crack was observed in the entire outer peripheral face of this plate-like partitioning wall 1. Accordingly, it was made clear that this plate-like partitioning wall 1 functions as a β-alumina partitioning wall for a sodium-sulfur battery.

The plate-like partitioning wall 1 of the present embodiment is obtained such that: four medical gauzes superposed on each other, used as a to-be-lost pattern, are disposed in a β-alumina granulated powder, are subjected to pressure forming in a mold, and are further subjected to CIP forming, to obtain a green compact; and then, the green compact is fired in an ordinary manner. That is, no special operation is performed except that four medical gauzes superposed on each other are used as a to-be-lost pattern. Nonetheless, the negative electrode chamber 10 considered to be perfect without any crack is formed in a slit-shape, in a center part in the thickness direction of a plate-like β-alumina sintered body.

(2) β-Alumina Plate-Like Partitioning Wall of Embodiment 2

Figure 2:
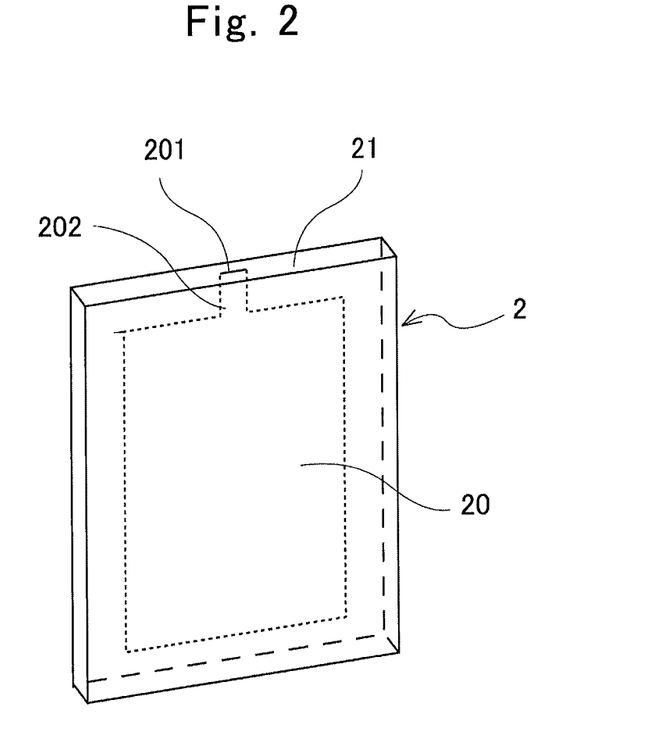
FIG. 2 is a perspective view of the entirety of a β-alumina plate-like partitioning wall according to Embodiment 2.

FIG. 2 shows a perspective view of the entirety of a β-alumina plate-like partitioning wall 2 of Embodiment 2. This plate-like partitioning wall 2 has a plate-like shape measuring about 10 cm vertically and laterally, and about 0.7 cm in thickness, and the entirety of the plate-like partitioning wall 2 is formed from β-alumina. This plate-like partitioning wall 2 has, in a center part in the thickness direction thereof, a negative electrode chamber 20.

This negative electrode chamber 20 is, with the shape thereof indicated by a dotted line in FIG. 2, composed of a void-like space: extending in two-dimensional directions in a center part in the thickness direction of the plate-like partitioning wall 2; having a square shape measuring about 7.5 cm vertically and laterally; and having a thickness of about 0.01 mm. This negative electrode chamber 20 has an opening part 202 exposed in the form of an opening 201 at the upper end 21 of the negative electrode chamber 20. This opening part 202 is also formed as a part of a burn-out pattern composed of four gauzes, simultaneously with the negative electrode chamber 20, and is composed of a void-like space having a thickness of about 0.01 mm.

This negative electrode chamber 20 is also composed of a void-like thin space, similar to the negative electrode chamber 10 of the plate-like partitioning wall 1 of Embodiment 1, and innumerable fine columnar connection parts integrally coupling both sides of this void-like space are considered to be present. The front-face-side portion and the back-face-side portion of the plate-like partitioning wall 1 on both sides of this void-like space are considered to be integrally connected by these innumerable columnar connection parts, to serve as an integrated object and contribute to improvement of mechanical strength.

For this plate-like partitioning wall 2, the same β-alumina granulated powder and the same four medical gauzes superposed on each other to serve as a burn-out pattern as those of the plate-like partitioning wall 1 of Embodiment 1, were used. For a compression forming device, a commercially-available 500 ton press for manufacturing tiles and a mold for producing tiles of about 10 cm vertically and laterally were used. Half of the granulated powder was placed in the mold, four gauzes were superposed thereon, further, the remainder of the granulated powder was placed thereon, and pressure was applied, to produce a plate-like compacted body. Then, the plate-like compacted body was subjected to CIP forming, and then heated to about 1600° C. to be sintered. In this manner, the plate-like partitioning wall 2 shown in FIG. 2 was manufactured.

Figure 3:
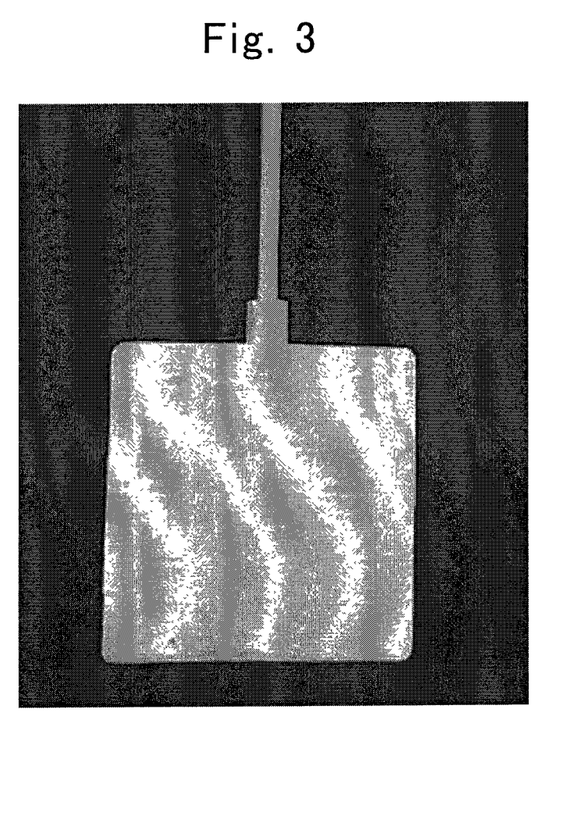
FIG. 3 shows a photograph of a β-alumina plate-like partitioning wall joined with an alumina-made nipple and an alumina tube, according to Embodiment 2.

An alumina-made nipple having an axial pore was disposed so as to cover the opening 201 of this plate-like partitioning wall 2, further, an alumina tube was fitted to the axial pore of this nipple, and an integrally joined part was produced by using a glass joining material. FIG. 3 shows a photograph of this part. The negative electrode chamber 20 of the plate-like partitioning wall 2 forming this part is in communication with the void of the opening part 202, the axial pore of the nipple, and the axial pore of the alumina tube, so as to allow molten sodium to flow.

A sodium-sulfur single battery was produced by using this part. The plate-like partitioning wall 2 of this part was stored in a stainless steel sulfur container in a state where a glass fiber cloth as an electric insulator and a carbon fiber felt as a collector were stacked on each of the front face and the back face of the plate-like partitioning wall 2, such that an upper portion of the alumina tube protrudes from the upper end of the sulfur container. 347 g of sulfur was put in this sulfur container, and the sulfur container was sealed under reduced pressure in an airtight manner. An upper end portion of the alumina tube protruding from the sulfur container was inserted in an airtight manner from a lower end of a stainless steel sodium container, 56 g of sodium was put in the sodium container, and the sodium container was sealed under reduced pressure in an airtight manner. Accordingly, a sodium-sulfur single battery using the plate-like partitioning wall 2 of the present Embodiment 2 was produced.

This sodium-sulfur single battery was placed in a thermostat bath kept at about 300° C., an external circuit of about 0.7 ω was formed between the sulfur container and the sodium container, and a discharge test was performed, whereby discharging current of about 3.5 A to 6.7 A was obtained. Charging current obtained when charging was performed by applying charging voltage of 2.57 V between the sulfur container and the sodium container was about 1 A to 2 A. Further, a cycle test of discharging and charging was performed by using this sodium-sulfur single battery. A discharge time period of one time was set to 20 hours, a charge time period of one time was set to 100 hours, and cycle tests of discharging and charging were continuously performed for about one month. In this period, during discharging and charging, no problem such as abnormal decrease in current occurred. Thus, it was made clear that the plate-like partitioning wall 2 of the present Embodiment 2 is usable as a partitioning wall of a sodium-sulfur battery.

(3) β-Alumina Plate-Like Partitioning Wall of Embodiment 3

Figure 4:
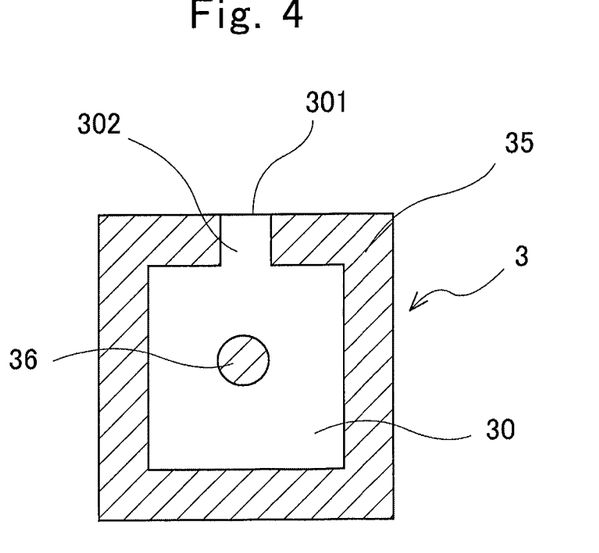
FIG. 4 is a cross sectional view at the center in the thickness direction of a β-alumina plate-like partitioning wall according to Embodiment 3.

FIG. 4 shows a cross section at the center in the thickness direction of a β-alumina plate-like partitioning wall 3 of Embodiment 3. This plate-like partitioning wall 3 has a plate-like shape measuring about 40 mm vertically and laterally, and about 4.5 mm in thickness. The plate-like partitioning wall 3 is composed of: a front-side wall part 31 made of β-alumina and measuring about 40 mm vertically and laterally and about 2.0 mm in thickness; a back-side wall part (not shown) having the same shape as that of the front-side wall part 31; and a frame part 35 having a width of about 7 mm and a thickness of about 0.5 mm in a square shape devoid of a part thereof, and a support part 36 having a diameter of about 7 mm and a thickness about 7 mm, the frame part 35 and the support part 36 being indicated by oblique lines and being formed by melting a glass joining material. The frame part 35 and the support part 36 are present between peripheral edge portions of both opposing faces of the front-side wall part 31 and the back-side wall part and in a center portion of said both opposing faces, respectively, and integrally join both.

This plate-like partitioning wall 3 has a negative electrode chamber 30 having a square shape whose one side is about 26 mm and whose thickness is about 0.5 mm, the negative electrode chamber 30 being defined by the opposing faces of the front-side wall part 31 and the back-side wall part and the inner peripheral face of the frame part 35. The support part 36 is positioned in a center portion of this negative electrode chamber 30. This plate-like partitioning wall 3 has an opening part 302 defined by both end opposing faces of the frame part 35 and the opposing faces of the front-side wall part 31 and the back-side wall part and connected to the negative electrode chamber 30. This opening part 302 is open as an opening 302 in a center part of the upper end face of the plate-like partitioning wall 3.

Manufacture of the plate-like partitioning wall 3 of the present Embodiment 3 will be described. For the β-alumina sintered bodies, on thin plates, to serve as the front-side wall part 31 and the back-side part of this plate-like partitioning wall 3, the same β-alumina granulated powder as that used in manufacture of the plate-like partitioning wall 1 of Embodiment 1 was used and pressed by a forming mold, to form a compacted body. Without being subjected to CIP forming, the compacted body was heated to 1600° C. in a firing furnace, to produce a sintered body. A glass joining material was applied into a frame shape and a circular shape shown in FIG. 4, to one face of each of the obtained two β-alumina sintered bodies. Then, the applied glass joining material was brought into contact with these two β-alumina sintered bodies such that the β-alumina sintered bodies are superposed on each other, and the resultant matter was disposed in a firing furnace. Then, the firing furnace was heated to melt the glass joining material, to integrally attach the two β-alumina sintered bodies to each other, whereby the plate-like partitioning wall 3 of the present Embodiment 3 was manufactured.

Molten sodium was put, under pressure, into the negative electrode chamber 30 of this plate-like partitioning wall 3, in the same manner as that in Embodiment 1. The presence of the molten sodium in the negative electrode chamber 30 was confirmed in a manner similar to that in Embodiment 1.

Accordingly, the plate-like partitioning wall 3 of the present Embodiment 3 was also clarified to be usable as a partitioning wall of a sodium-sulfur battery.

DESCRIPTION OF REFERENCE CHARACTERS

1, 2, 3 plate-like partitioning wall
10, 20, 30 negative electrode chamber
13, 201, 301 opening
202, 302 opening part

The invention claimed is:

1. A plate-like partitioning wall formed from a solid electrolyte allowing permeation of sodium ions therethrough, the plate-like partitioning wall having a plate-like shape and having, in a center part in a thickness direction thereof, a negative electrode chamber to which molten sodium is supplied,
the negative electrode chamber being formed as a thin space extending in two-dimensional directions or as a thin pore-like space formed with fine pores extending in three-dimensional directions continuously and extending in two-dimensional directions,
wherein the thin space and the thin pore-like space are formed so as to be closed by sodium sulfide generated in reaction with molten sulfur that enters the negative electrode chamber when the plate-like partitioning wall is broken.

2. The plate-like partitioning wall according to claim 1, wherein the thin space has a thickness of not greater than 0.5 mm.

3. The plate-like partitioning wall according to claim 1, wherein the thin space has a thickness of not greater than 0.1 mm.

4. The plate-like partitioning wall according to claim 1, wherein the thin space has a support part penetrating the foil-like space in a thickness direction of the space.

5. The plate-like partitioning wall according to claim 1, wherein the thin pore-like space has a pore diameter of not greater than 0.5 mm.

6. The plate-like partitioning wall according to claim 5, wherein the thin pore-like space has a pore diameter of not greater than 0.1 mm.

* * * * *